US009504957B2

(12) United States Patent
Liu et al.

(10) Patent No.: US 9,504,957 B2
(45) Date of Patent: Nov. 29, 2016

(54) FLUE GAS DESULFURIZATION APPARATUS

(71) Applicant: University of Kentucky Research Foundation, Lexington, KY (US)

(72) Inventors: Kunlei Liu, Lexington, KY (US); Joseph E. Remias, Woodbridge, VA (US)

(73) Assignee: UNIVERSITY OF KENTUCKY RESEARCH FOUNDATION, Lexington, KY (US)

( * ) Notice: Subject to any disclaimer, the term of this patent is extended or adjusted under 35 U.S.C. 154(b) by 0 days.

(21) Appl. No.: 14/590,466

(22) Filed: Jan. 6, 2015

(65) Prior Publication Data

US 2015/0190750 A1    Jul. 9, 2015

Related U.S. Application Data

(60) Provisional application No. 61/923,903, filed on Jan. 6, 2014.

(51) Int. Cl.
   *B01D 53/50*    (2006.01)
   *B01D 53/75*    (2006.01)
   *C01F 11/46*    (2006.01)

(52) U.S. Cl.
   CPC ........... *B01D 53/504* (2013.01); *C01F 11/464* (2013.01); *B01D 2251/404* (2013.01); *B01D 2257/302* (2013.01)

(58) Field of Classification Search
   CPC ... B01D 53/501; B01D 53/504; B01D 53/75
   See application file for complete search history.

(56) References Cited

U.S. PATENT DOCUMENTS

| | | | | |
|---|---|---|---|---|
| 4,008,310 | A | * | 2/1977 | Gorin .................... C01B 17/164 423/243.08 |
| 4,231,995 | A | | 11/1980 | Campbell et al. |
| 4,708,856 | A | * | 11/1987 | Rukovena, Jr. ...... B01D 53/501 423/243.09 |
| 5,674,459 | A | | 10/1997 | Gohara et al. |
| 6,890,497 | B2 | | 5/2005 | Rau et al. |
| 6,923,852 | B2 | | 8/2005 | Vrotsos |
| 7,255,842 | B1 | | 8/2007 | Yeh et al. |
| 7,282,189 | B2 | | 10/2007 | Zauderer |
| 7,514,053 | B2 | | 4/2009 | Johnson et al. |
| 7,618,478 | B2 | | 11/2009 | Kumar |
| 7,678,351 | B2 | | 3/2010 | Iyer et al. |
| 7,699,909 | B2 | | 4/2010 | Lackner et al. |
| 7,722,842 | B2 | | 5/2010 | Park et al. |
| 7,739,864 | B2 | | 6/2010 | Finkenrath et al. |
| 7,766,999 | B2 | | 8/2010 | Ha |
| 7,794,690 | B2 | | 9/2010 | Abatzoglou et al. |
| 7,811,359 | B2 | | 10/2010 | Tandon et al. |
| 7,819,951 | B2 | | 10/2010 | White et al. |
| 7,827,778 | B2 | | 11/2010 | Finkenrath et al. |
| 7,829,053 | B2 | | 11/2010 | Constantz |

(Continued)

FOREIGN PATENT DOCUMENTS

WO    9926714 A1    6/1999

*Primary Examiner* — Timothy Vanoy
(74) *Attorney, Agent, or Firm* — King & Schickli, PLLC

(57) ABSTRACT

An apparatus is provided for removing sulfur oxides from a flue gas stream. That apparatus includes an absorber tower having an upper section and a lower section. A packed bed unit is provided in the upper section of the absorber tower. A first recycling circuit is provided for recycling lime water to the lower section of the absorber. Further the apparatus includes a second recycling circuit for recycling caustic solution to the packed bed unit.

19 Claims, 4 Drawing Sheets

(56) References Cited

U.S. PATENT DOCUMENTS

| | | |
|---|---|---|
| 7,833,328 B2 | 11/2010 | Lackner et al. |
| 7,842,126 B1 | 11/2010 | Dilmore et al. |
| 7,842,264 B2 | 11/2010 | Cooper et al. |
| 7,846,240 B2 | 12/2010 | Gal et al. |
| 7,846,407 B2 | 12/2010 | Hu |
| 7,850,763 B2 | 12/2010 | White et al. |
| 7,862,788 B2 | 1/2011 | Gal et al. |
| 7,879,305 B2 | 2/2011 | Reddy et al. |
| 7,887,694 B2 | 2/2011 | Constantz et al. |
| 7,895,822 B2 | 3/2011 | Hoffmann et al. |
| 7,896,948 B2 | 3/2011 | Deng et al. |
| 7,896,953 B1 | 3/2011 | Goswami et al. |
| 7,901,485 B2 | 3/2011 | McCutchen |
| 7,901,487 B2 | 3/2011 | Rochelle |
| 7,901,488 B2 | 3/2011 | Rochelle et al. |
| 7,906,086 B2 | 3/2011 | Comrie |
| 7,914,758 B2 | 3/2011 | Murray et al. |
| 7,922,792 B1 | 4/2011 | Soong et al. |
| 7,947,239 B2 | 5/2011 | Lackner et al. |
| 7,947,240 B2 | 5/2011 | Vandor |
| 7,966,829 B2 | 6/2011 | Finkenrath et al. |
| 7,993,432 B2 | 8/2011 | Wright et al. |
| 8,012,453 B2 | 9/2011 | Saxena |
| 8,617,494 B2 * | 12/2013 | Wang ................. F23J 15/04 165/913 |
| 9,346,007 B2 * | 5/2016 | Reddy ............... B01D 53/1456 |
| 9,375,676 B2 * | 6/2016 | Nakamura ......... B01D 53/1425 |
| 9,399,939 B2 * | 7/2016 | Shimamura ........... B01D 53/62 |
| 2006/0286011 A1 * | 12/2006 | Anttila ................ B01D 53/502 422/168 |
| 2009/0148371 A1 * | 6/2009 | Reddy .................. B01D 53/60 423/235 |
| 2011/0008229 A1 * | 1/2011 | Iyengar ............. B01D 53/1406 423/229 |
| 2011/0308389 A1 * | 12/2011 | Graff ................ B01D 53/1406 95/166 |
| 2012/0251418 A1 * | 10/2012 | Sieder ............... B01D 53/1406 423/210 |
| 2013/0327025 A1 * | 12/2013 | Shimamura ............. C01B 31/20 60/274 |

* cited by examiner

FLUE GAS DESULFURIZATION APPARATUS

RELATED APPLICATIONS

This application claims priority to U.S. Provisional Patent Application Ser. No. 61/923,903, filed Jan. 6, 2014.

TECHNICAL FIELD

This document relates generally to the removal of sulfur oxides from flue gas.

BACKGROUND

The recognized need for sulfur oxide removal from flue gas has been known since the early 1900's when the large volumes of $SO_x$ emissions from power plants were first noted to cause an impact on the environment. Since then the field has grown substantially with the modern era of flue gas desulfurization (FGD) being implemented on a commercial scale since the early 1970s. While many methods exist for the removal of this acid gas from flue gas the most prevalent is a calcium-based FGD process including limestone-based Wet FGD and lime-based Semi-dry FGD. In these respective methods, the $SO_x$ containing flue gas is contacted with a slurry or wet powder based spray in an absorption tower. For instance, the acid gas is absorbed into the liquid and reacts with the base to form a neutral insoluble calcium salt. The salt is removed by filtration and disposed of or sold as a byproduct.

The pressure on utilities to continuously reduce emissions from power plants, most particularly coal-fired plants, has continuously increased adoption of FGD technology including both new construction and retrofit applications. While effective, the FGD technology must be improved further to meet more restricted emission standards and to reduce the capital and operating cost. Some of the legislation passed in the US recently includes the interstate transport rule which would require by the EPA's own estimate the further installation of pollution control devices or a switch to lower sulfur coal. Under current prevailing market conditions this would instead mean a switch to natural gas. The pressure to reduce emissions is also strengthening in China where published rules would require $SO_x$ removal from coal flue gas (less than 50 µm/m$^3$, e.g. 17.5 ppm in volume equivalent) beyond the design limits of state-of-the-art FGD systems to fight the serious smog in the eastern coast of China.

The state-of-art calcium-based FGD technology has been increased with modern design capabilities stated at as high as 99% $SO_x$ removal. However, the bulk of wet systems operate at around 97% capture efficiency with the absolute $SO_2$ emission level of no less than 50 ppm typically due to the variation of unit loading, ambient conditions and FGD downtime. If the new Chinese emission standard is set at 17.5 ppm, for a flue gas containing 4000 ppm produced from a coal with sulfur content of approximately 3.5%, a minimum removal efficiency of 99.6% will be required meaning that new concepts in flue gas desulfurization will need to be implemented while maintaining the cost-effectiveness of a calcium-based FGD system. Here, a new concept in FGD is proposed that integrates a traditional wet calcium FGD (Ca-WGD) for coarse removal with an additional sodium-based packed bed absorber (Na-PBA) at the top for deep $SO_x$ capture precipitated by addition of calcium to the solution. The integrated process maximizes efficiency and minimizes cost. The unit design also prevents fouling, scaling, or plugging of the packed bed absorber that would be associated with the implementation of packing above a traditional Ca-WFGD.

SUMMARY

In accordance with the purposes and benefits described herein, an apparatus is provided for removing sulfur oxides from a sulfur-contained fuel combustion-derived flue gas stream. That apparatus comprises an absorber tower including a reaction chamber. A liquid collection tray divides that reaction chamber into an upper section and a lower section. A packed bed unit is provided in the upper section. The apparatus further includes a first circuit for circulating a first solution through the lower section in a first direction. That first solution may comprise limewater, a limestone slurry or combinations thereof.

Further, the apparatus includes a second circuit for circulating a second, caustic solution through the upper section and the packed bed unit in the first direction. In one possible embodiment, that caustic solution comprises soluble calcium compounds such as limewater or limestone in combination with an alkali caustic reagent (e.g. sodium hydroxide, potassium hydroxide, sodium carbonate/bicarbonate, potassium carbonate/bicarbonate and combinations thereof) at a pH between 6 and 7.5.

In addition, the apparatus includes a flue gas inlet in communication with the lower section and a treated flue gas outlet in communication with the upper section whereby a flue gas stream passes in a second direction through the lower section, then past the liquid collection tray and then through the upper section including the packed bed unit.

More specifically, the collection tray collects the caustic solution while allowing passage of the flue gas in the second direction. In addition a liquid basin or sump is provided at a bottom of the lower section.

The first circuit includes at least one first spray head, a first inlet in communication with the sump and at least one first pump for circulating the first solution from the sump to the first spray head. The second circuit includes at least one second spray head, a second inlet in communication with the liquid collection tray and at least one second pump for circulating the caustic solution from the liquid collection tray to the second spray head overlying the packed bed unit.

Still further, the second unit includes a slurry reaction tank and a solids/wetcake separator whereby lime or limestone is added to the sulfur rich caustic solution in the slurry tank to convert the soluble sulfur species to gypsum and the gypsum and other solids are then removed from the caustic solution before circulating that regenerated caustic solution back to the second spray head.

The apparatus also includes a caustic solution source connected to the second circuit between the separator and the second spray head to make up for caustic solution consumed/lost during flue gas processing.

In addition, the apparatus includes a gypsum discharge circuit. The gypsum discharge circuit includes a third inlet in communication with the sump, at least one third pump, at least one solids separator and an outlet in communication with the first spray head whereby gypsum is separated from the first solution and the first solution is returned to the lower section of the absorber tower.

Still further, the absorber tower includes an oxidation air inlet in communication with the lower section as well as a first solution makeup circuit. This makeup circuit includes a water source, a source of lime or limestone, a mill for milling that lime or limestone, a second slurry tank for receiving water and lime or limestone from the sources and creating the first solution, a fourth pump and an outlet for delivering the first solution from the fourth pump to the lower section of the absorber tower.

In accordance with an additional aspect, a method is provided for removing sulfur oxides from a flue gas stream. That method includes the steps of: (a) delivering a flue gas stream to an absorber tower including lower and upper sections, (b) treating the flue gas stream with a counter current stream of a first solution of limewater or limestone slurry in the lower section, (c) subsequently passing the flue gas stream through a packed bed unit while contacting the flue gas stream with a caustic solution in the upper section, and (d) discharging a treated flue gas stream from the absorber tower.

More specifically, the method includes collecting the caustic solution in a liquid collecting tray at a bottom of the upper section and then removing soluble sulfur-species from the collected caustic solution. In one possible embodiment, the sulfur is removed by reacting the sulfur with soluble calcium in order to produce gypsum and then separating that gypsum and other solids from the caustic solution. The regenerated caustic solution is then recirculated to the upper section through the second spray head overlying the packed bed unit.

In the following description, there are shown and described several preferred embodiments of the apparatus and method. As it should be realized, the apparatus and method is capable of other, different embodiments and its several details are capable of modification in various, obvious aspects all without departing from the apparatus and method as set forth and described in the following claims. Accordingly, the drawings and descriptions should be regarded as illustrative in nature and not as restrictive.

BRIEF DESCRIPTION OF THE DRAWING FIGURES

The accompanying drawing figures incorporated herein and forming a part of the specification, illustrate several aspects of the apparatus and method and together with the description serve to explain certain principles thereof. In the drawing figures.

Reference will now be made in detail to the present preferred embodiments of the FGD apparatus, examples of which are illustrated in the accompanying drawing figures.

DETAILED DESCRIPTION

Figure 1:
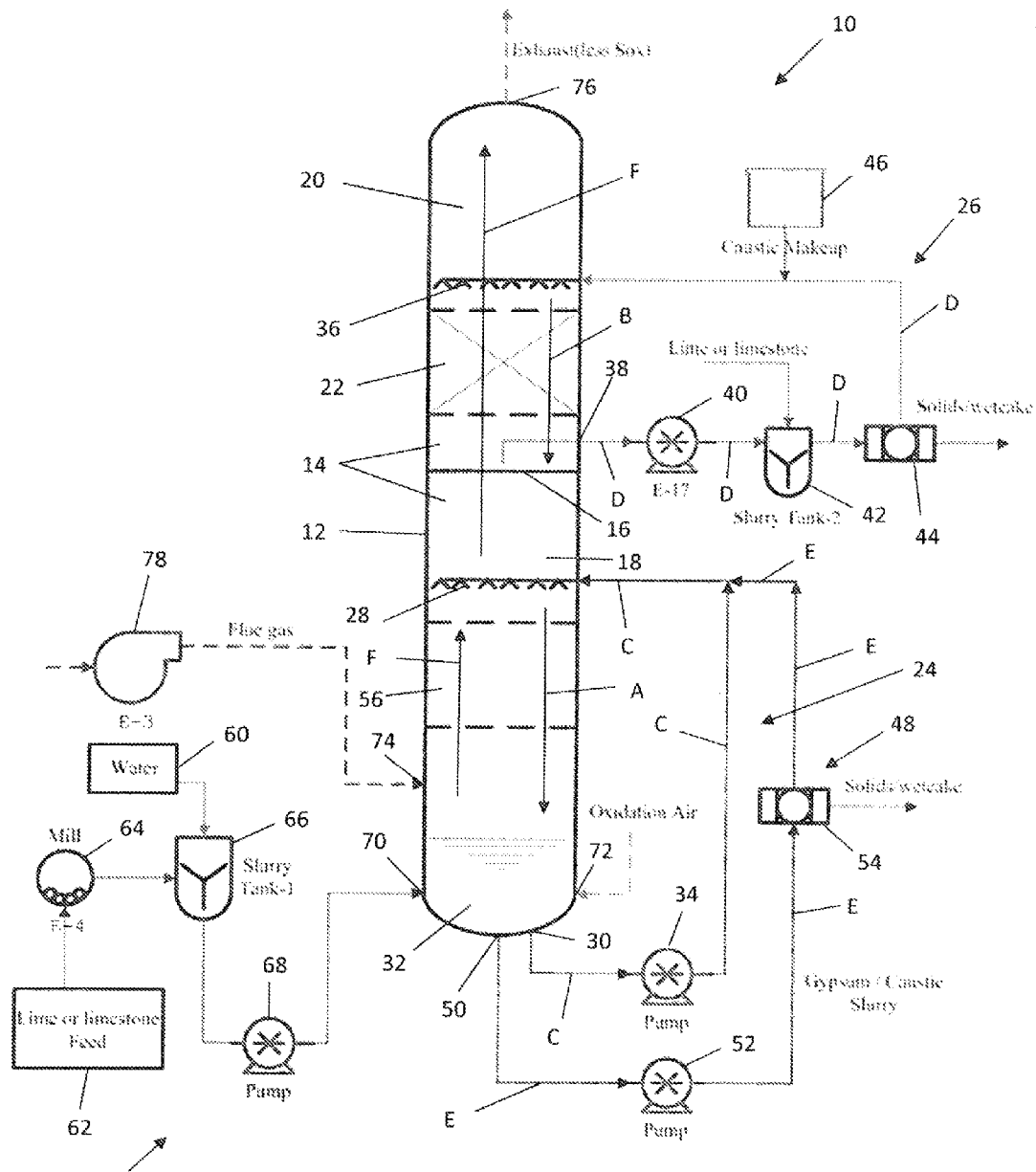
FIG. 1 is a schematic diagram of the flue gas desulfurization (FGD) apparatus for removing sulfur oxides from a flue gas stream.

Reference is now made to FIG. 1 which is a schematic illustration of the FGD apparatus 10. That apparatus includes an absorber tower 12 including a reaction chamber 14. A liquid collection tray 16 divides the reaction chamber 14 into a lower section 18 and an upper section 20.

More specifically, the liquid collection tray 16 comprises a perforated metal plate with many bubbling caps to let flue gas through but collect liquid. More specifically, the open area of bubbling caps is in the range of 15 to 40% of tower cross-section area. The log of bubbling caps is in the range of 6-12 inches to form a liquid reservoir for pump performance.

A packed bed unit 22 is provided in the upper section 20. That packed bed unit 22 may, for example, comprise a set of waveplates, or angle steels or perforate plates with solid fraction being less than 15%

A first circuit, generally designated by reference numeral 24, circulates a first solution through the lower section 18 of the tower 12 in a first direction (note action arrows A). A second circuit, generally designated by reference numeral 26, circulates a second solution through the upper section 20 of the tower 12 and the packed bed unit 22 in the same or first direction (note action arrows B). The first solution circulated by the first circuit 24 through the lower section 18 of the tower 12 is selected from a group of solutions consisting of limewater, a limestone slurry and combinations thereof. Typically the first solution has a pH between 2.5 and 7. The second solution that is circulated by the second circuit 26 through the packed bed unit 22 and the upper section 20 of the absorber tower 12 is a caustic solution. In one possible embodiment, that caustic solution comprises soluble calcium compounds such as limewater or limestone slurry in combination with alkali caustic reagent at a pH of between 6 and 7.5. In one possible embodiment that alkali caustic reagent is selected from a group of reagents consisting of sodium hydroxide, potassium hydroxide, sodium carbonate/bicarbonate, potassium carbonate/bicarbonate and mixtures thereof.

The first circuit 24 includes at least one spray head 28, a first inlet 30 in communication with a sump 32 at a bottom of the lower section 18 of the tower 12 and at least one pump 34 for circulating the first solution from the sump to the first spray head. Note action arrows C.

The second circuit 26 includes at least one spray head 36, a second inlet 38 in communication with the liquid collection tray 16 and a pump 40 for circulating the caustic solution from the liquid collection tray to the second spray head overlying the packed bed unit 20 (note action arrows D).

As further illustrated, the second circuit 26 includes a slurry tank 42 and a solids/wet cake separator 44 that function to eliminate sulfur from the caustic solution. More specifically, lime or limestone is added to the sulfur rich caustic solution in the slurry tank 42 to convert the soluble sulfur to gypsum and the gypsum and other solids are then removed from the caustic solution before circulating the regenerated caustic solution back to the spray head 36 overlying the packed bed unit 22. A caustic solution source 46 is connected to the second circuit 26 between the separator 44 and the spray head 36 to make up for any caustic solution utilized or lost during processing of the flue gas stream.

As further illustrated in FIG. 1, the apparatus 10 also includes a gypsum discharge circuit, generally designated by reference numeral 48. The gypsum discharge circuit includes an inlet 50 in communication with the sump 32, at least one pump 52, at least one solids separator 54 and an outlet 56 in communication with the first spray head 28. More specifically, gypsum rich first solution travels through the inlet 50 and the pump 52 to the solids separator 54 where the gypsum is removed from the first solution and the regenerated first solution is returned to the lower section 18 of the tower 12 (note action arrows E). In one possible embodiment, that lower section 18 comprises a simple open spray tower. In another possible embodiment, that lower section incorporates an open tray structure schematically illustrated at 56. That open tray structure 56 may comprise a perforate plate with open area being in the range of 20-50% of tower cross-section.

As further illustrated in FIG. 1, the apparatus 10 also includes a first solution makeup circuit generally designated by reference numeral 58. The first solution make up circuit 58 includes a water source 60, a source of lime or limestone 62, a mill 64 for milling the lime or limestone to a desired particle size, a second slurry tank 66 for receiving water and lime or limestone from the sources and creating the first solution, a fourth pump 68 and an outlet 70 for delivering the first solution from the slurry tank 64 and pump 68 to the lower section 18 of the absorber tower 12. This allows for the makeup of first solution utilized or lost during processing of the flue gas stream.

As illustrated in FIG. 1, an oxidation air inlet 72 is provided in communication with the lower section 18 of the tower 12. This allows for the injection of oxidation air into the lower section to complete the conversion of calcium sulfite to calcium sulfate. As also illustrated in FIG. 1, a flue gas inlet 74 is provided in the wall of the tower 12 in communication with the lower section 18 and a treated flue gas outlet 76 is provided in the wall of the tower in communication with the upper section 20. As previously noted, the liquid collection tray 16 that divides the chamber 14 into the lower and upper sections 18, 20 functions to collect the caustic solution at the bottom of the upper section while allowing the passage of the flue gas stream. Accordingly, the flue gas stream delivered by the fan 78 travels through the absorber tower 12 in a second direction from the flue gas inlet 74 serially through the lower section 18, the liquid collection tray 16 and the packed bed unit 22 of the upper section 20 and then through the outlet 76 (note action arrows F). In contrast, the first solution travels in the direction of action arrow A through the lower section 18 from the spray head 28 to the sump 32. Similarly, the caustic solution travels through the upper section 20 in the direction of action arrow A from the spray head 36 through the packed bed unit 22 to the liquid collection tray 16. Thus, it should be appreciated that as the flue gas stream travels through the absorber tower 12 it is initially contacted by a countercurrent flow of the first solution and then a countercurrent flow of the second solution. It is the serial treatment of the flue gas stream with the first solution and the second or caustic solution that provides for the more efficient and effective removal of the sulfur oxides from the flue gas stream.

The following example is presented to further illustrate the invention but it should not be considered as being limited thereto.

EXAMPLE

In the process described and depicted in FIG. 1, the flue gas stream from coal combustion enters the bottom of the absorber tower 12 through the flue gas inlet 70. The concentration of $SO_x$ in this stream is between 100-6000 ppm and is dependent on the type of coal. In the open or semi-open lower section 18 of the absorber tower 12 the flue gas flows upward and is contacted with a slurry of limestone. The solution is recirculated via a slurry pump 34 from a large sump 32 with or without oxidizing air at the bottom of the tower to the top of the open section. The liquid volume and pH in the sump 32 is maintained to allow dissolving of limestone and reaction of the absorbed sulfite products into calcium sulfite as well as oxidation of the sulfite to sulfate.

The upper section 20 of the tower 12 further scrubs the $SO_x$ molecules to very low levels <20 ppm (deep $SO_x$ removal) or the desired target.

As previously noted, the upper section 20 includes a packed bed unit 22 with 100% liquid collection and recirculation. The packed bed is an integrated unit with the lower section 18 of the absorber tower 12 to provide a single tower for absorption. The packed bed or column 22 is isolated from the lower section 18 by way of the liquid collection tray 16 that allows most or all of the solution to be recirculated to the top of the upper section 20. The packing selected for this this bed 22 is typically constructed of a structured packing material to maximize gas-liquid mass transfer and minimize the pressure drop across the column. A portion of the solution (containing the alkali sulfite molecules) would continuously pump into the separated vessel for cation exchange using the significant solubility difference between calcium and sodium sulfite/sulfate at the working pH range, which could eventually convert to calcium sulfate with air oxidation.

The chemistry of the process is summarized in the following chemical equations:

$$SO_2 + H_2O \leftrightarrow H_2SO_3 \text{ Absorption}$$

$$CaCO_3 + H_2SO_3 \rightarrow CaSO_3 + CO_2 + H_2O \text{ Neutralization}$$

$$CaSO_3 + \frac{1}{2}O_2 \rightarrow CaSO_4 \text{ Oxidation}$$

$$CaSO_3 + \frac{1}{2}H_2O = CaSO_3 \cdot \frac{1}{2}H_2O \text{ Crystallization}$$

$$CaSO_4 + 2H_2O \rightarrow CaSO_4 \cdot 2H_2O \text{ Crystallization}$$

$$2NaHCO_3 + SO_2 \rightarrow Na_2SO_3 + H_2O \text{ Absorption}$$

$$Na_2SO_3 + Ca^{+2} \rightarrow CaSO_3 + 2Na^+ \text{ Cation Exchange}$$

The upper section 20 uses a primarily sodium or potassium bicarbonate solution for the absorption of the $SO_x$ compounds. The pH of this solution is typically maintained between 6 and 7.5 (saturated with $CO_2$) to disfavor the absorption of $CO_2$ by the process, compared to approximately 9-11 for amine-based $CO_2$ capture solution. The target solution could be achieved by dosing any readily available alkali caustic such as for example sodium hydroxide, sodium carbonate, potassium hydroxide, or potassium carbonate prior to the solution cation regeneration. The solution rapidly absorbs $CO_2$ and $SO_2$ from the processed flue gas to achieve the desired operating range. Consequently, the primary reaction in the process will be the reaction of sodium ion and $SO_x$ to form as sodium sulfite. The part of the solution that leaves the top packed bed 22 travels to the slurry tank 42 where the sodium sulfite in that solution reacts with calcium from the lime or limestone forming insoluble calcium sulfite instantaneously at pH<8.

Figure 2:
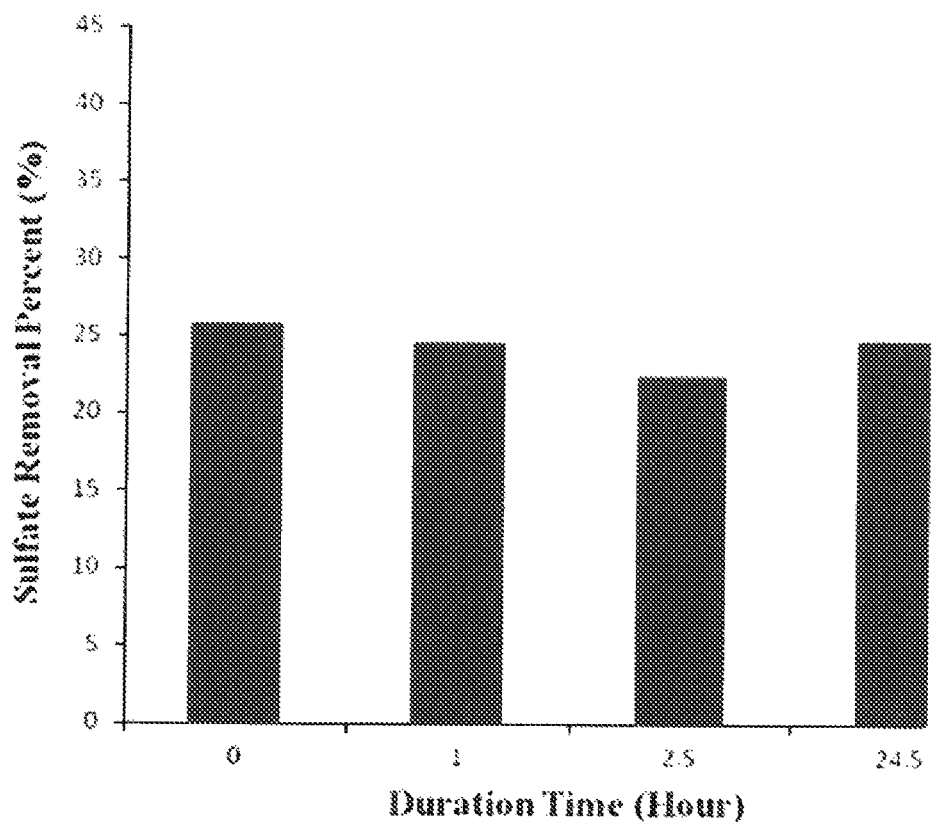
FIG. 2 is a graph illustrating sulfate/sulfite removal percent by CaO in WFGD sulfate rich solution at room temperature.

The concept was demonstrated using a solution of sodium carbonate/bicarbonate at pH 6.5. This solution was removed from a wet FGD coal-combustion scrubber. The content of the solution was approximately 10000 ppm of sulfite and sulfate compounds. Lime powder was added to the solution causing the immediate removal of 25% of the sulfate (see FIG. 2). The limitation here was the low buffering capacity of the sodium bicarbonate solution used. This caused the pH to very quickly reach pH of 12 where the lime has almost no solubility.

Pilot-Scale Coal Combustor and WFGD Apparatus

The Center for Advanced Energy Research (CAER) has a model CZML-0.058 flue gas generator (FGG) supplied by Liaonjing Haidisheng Mechanical Co., Ltd., China. The stoker is operated at atmospheric pressure with a coal feed rate up to 25 lb/hr that corresponds to approximately 56 ft$^3$/min (eq. 275 lb/hr) of flue gas generated. The FGG is equipped with soda ash based wet flue gas desulfurization. The FGG is fully integrated with the CAER $CO_2$ capture pilot plant unit. This FGG is routinely operated with a coal feed rate of 10 lb/hr, which corresponds to 20-25 ft$^3$/min of flue gas generated and is routed to the CAER $CO_2$ capture pilot plant unit.

A variable speed forced draft fan and a variable speed coal feed conveyor provide control to achieve the desired flow rates of air and coal to the FGG, respectively. An Aqua-Vent Model CDX-150-120-ST-MP closed loop glycol pump station and AVR-62-30 air cooled heat exchanger cooling system are used to control the combustion temperature. Gas exits the FGG and passes through a high-temperature cyclone separator to remove particulate matter. After the cyclone, $SO_2$ can be removed from the flue gas in a wet flue gas desulphurization (WFGD) unit, which is chilled with a Dimplex Thermal Solutions Model 5000MC-(S/O/W) air cooled water/glycol chiller for exhaust temperature control. The height of packing section is 0.85 meter. Under designed flue gas volumetric flow, the residence time of flue gas inside the reaction zone is approximately 0.95 second.

The typical FGG operating parameters are given in Table 1. Routine maintenance and calibration performed every week of running the coal combustor include: calibration of the inline pH probe, cleaning the FGG to remove excess ash, addition of fresh $SO_2$ scrubbing solution to the addition tank, cleaning the lines from the FGG to the forced draft fan to remove solids, cleaning the forced draft fan housing to remove solids. A log is kept of when the routine maintenance tasks are performed and who performs them.

TABLE 1

FGG system parameters

| | |
|---|---|
| Operating pressure | Atmospheric |
| Flue gas flowrate | 56 ft$^3$/min (270 lb/hr) |
| Particulate matter removal | Cyclone plus Gravimetric separator |
| $SO_2$ scrubbing | Wet flue gas desulphurization (WFGD) after $SO_2$ Removal |
| $CO_2$ | 10-13 vol % |
| $O_2$ | 4-8 vol % |
| $SO_2$ | 5-20 ppm |
| $NO_x$ | 70-80 ppm |
| $N_2$ | Balance |

Figure 3:
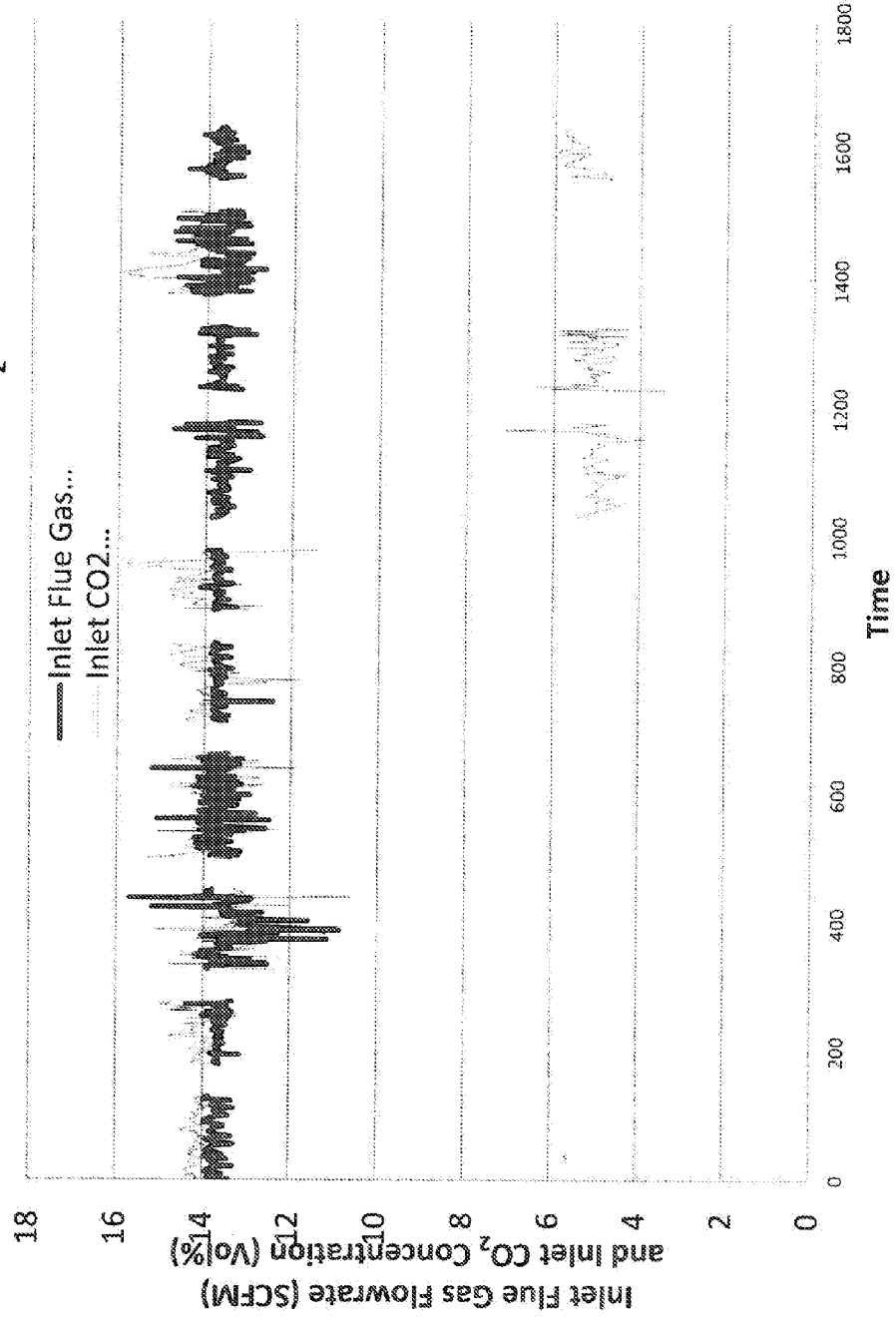
FIG. 3 is a graph illustrating variation of the inlet gas flowrate and $CO_2$ concentration.
Figure 4:
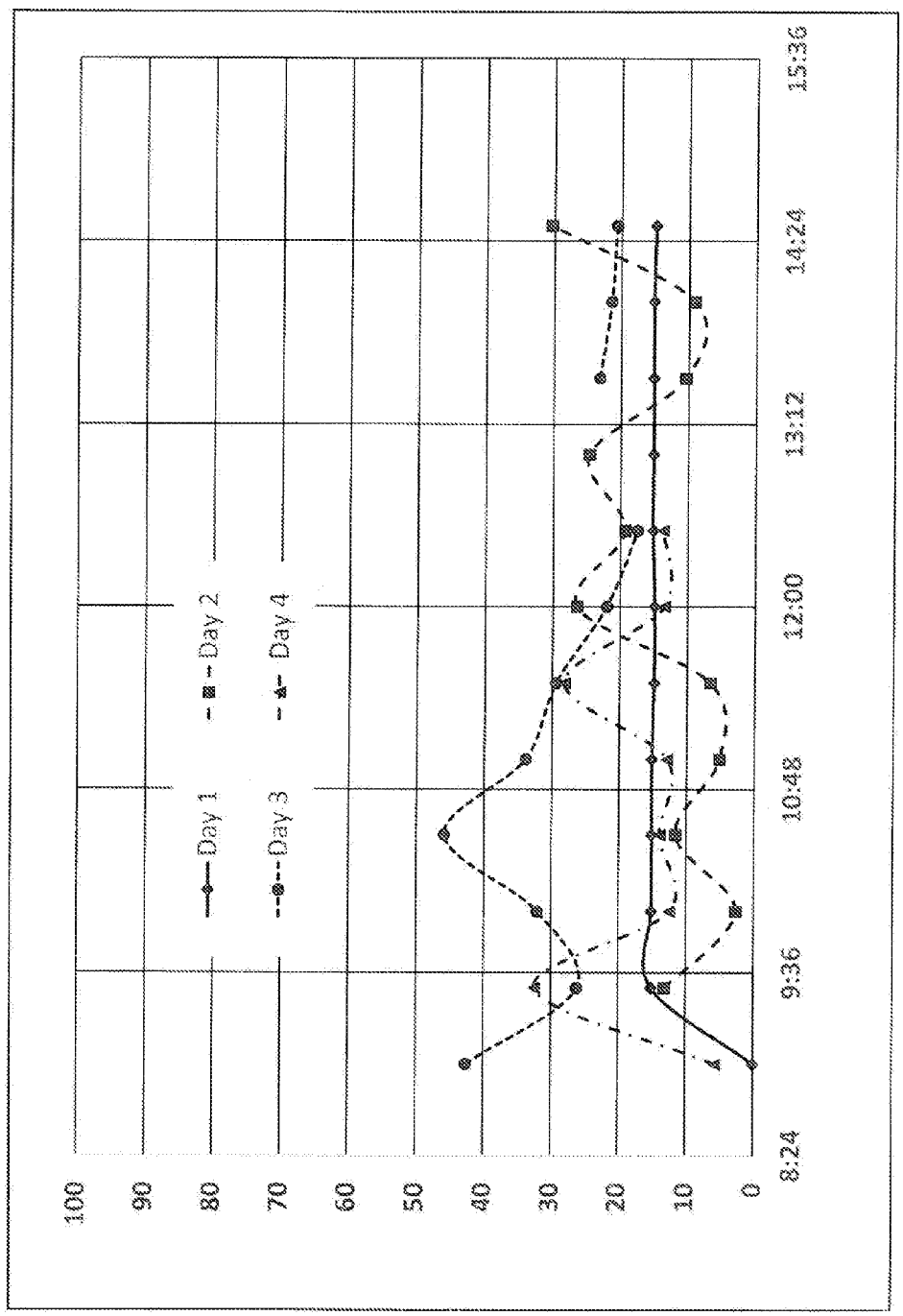
FIG. 4 is a graph illustrating the $SO_2$ concentration in the flue gas stream under various operating conditions.

The typical process variability of key process parameters of the CAER flue gas generation system are represented in FIG. 3. Each section of data is from one steady state condition, 10 run conditions in total, chosen at random spanning of operating periods. Transient-state data collected during this time, at start-up and during mid-run preventative maintenance tasks has been omitted. Process parameter data is recorded every two minutes with a National Instruments LabVIEW PLC system.

FIG. 3 shows the variation of the inlet flue gas flowrate and $CO_2$ concentration. The inlet flue gas flowrate is measured with a pitot tube just before inlet to the absorber. The flowrate is controlled automatically with a feedback control loop to a variable speed driven forced draft fan. For each data set shown, the inlet flue gas flow rate can be controlled at set points with the standard deviations vary from run to run from 0.08 to 1.43. The inlet $CO_2$ concentration is measured near the same point as the flowrate, with a Horiba five-gas analyzer. This analyzer is calibrated before each run, after approximately every 2 hours of steady-state data collection and checked at the end of each run. For the data sets shown, the $CO_2$ inlet concentration was either set to 14.0 vol % or 5.0 vol % and can be maintained with the average standard deviation at less than 0.46.

After combustion, the flue gas passes through a counter-current wet desulphurization unit (WFGD) where a soda ash solution is used to absorb $SO_2$. The pH of the $SO_2$ scrubbing solution was automatically controlled with a feedback control loop to a blowdown line and fresh solution makeup pump and set to a pH value of <7.0.

Results $SO_2$ Removal: The scrubbing condition is described below to show the deep $SO_x$ removal using high concentrated soda ash solution (8% wt of $Na^+$ as compared to 1% $Ca^{2+}$ solution) on CAER pilot-scale WFGD. A Pennsylvania stocker coal containing approximately 1.2 wt % of sulfur is burned for the flue gas source that contains around 1000 ppm of SOx at WFGD inlet. Here the L/G is maintained at approximately 6-9 L/m$^3$ as compared to 8-16 L/m$^3$ for conventional limestone-based WFGD system. As indicated in the FIG. 4, 5-25 ppm $SO_2$ in the stream at FGD exhaust can be achieved which represents 98-99.5% removal efficiency at testing conditions—low L/G ratio and short residence time.

Calcium Oxide $SO_2$ Precipitation: To demonstrate the cation exchange for sodium regeneration by calcium, a portion of the sulfite-rich scrubbing solution (pH of 7.8 at this point) was drained from the column reservoir into the stirred 55 gallon reaction vessel. A total volume of 35 gallons was drained from the column reservoir and water was added to make up to 50 gallons. Alkalinity and density measurements were taken in order to calculate the amount of CaO needed to precipitate the sulfite. The alkalinity was 0.563 mol/kg and the density was 1.03 g/mL. 2.6 pounds of CaO was added to the 50 gallons of sodium carbonate solution for sulfur removal and was mixed. The immediate solid precipitate was observed during the process of adding CaO into solution. The final pH of CaO treated solution is approximately 9. Next, the post CaO addition solution was pumped to a filter drum that housed a 5 micron polypropylene bag filter. These bags flowed well initially, but as calcium sulfite precipitate built up in the bag, there was significant liquid hold up. The end result was a translucent amber-colored, virtually particle-free, solution. The sulfur content in pretreat and aftertreat solution (analyzed by IC) shows that a sulfite removal percentage of approximately 90% was achieved through this reaction and filtering process.

The solid collected from filter was analyzed by ICP for $Ca^{2+}$ and $SO_4^{2-}$ content. As presented in the Table 2, as expected, sulfur is ion-exchanged from Na to Ca and forms gypsum as final product. Also, some portion of Na is co-precipitated with gypsum.

TABLE 2

The Solid Composition Analyzed by ICP

| % Moisture | % Na | % SO$_4$ | % Ca |
|---|---|---|---|
| 48.35 | 1.2 | 12.97 | 24.6 |
| Mole | 0.052174 | 0.135104 | 0.615 |

CONCLUSION

The experiment conducted on CAER pilot-scale WFGD apparatus demonstrates $SO_2$ concentration below 20 ppm can be achieved by using high concentrated sodium/potassium-based solution at low liquid recirculation rate. In the appropriate pH range, sodium/potassium solution can be effectively regenerated through cation exchange with calcium-based sorbent to form gypsum as final product for disposal or utilization.

The foregoing has been presented for purposes of illustration and description. It is not intended to be exhaustive or to limit the embodiments to the precise form disclosed. Obvious modifications and variations are possible in light of the above teachings. All such modifications and variations are within the scope of the appended claims when interpreted in accordance with the breadth to which they are fairly, legally and equitably entitled.

What is claimed:

1. An apparatus for removing sulfur oxides from a flue gas stream, comprising:
    an absorber tower including a reaction chamber;
    a liquid collection tray dividing said reaction chamber into a lower section and an upper section;
    a packed bed unit in said upper section
    a first circuit for circulating a first solution through said lower section in a first direction, wherein the first solution is selected from a group of solutions consisting of limewater, a limestone slurry and combinations thereof;
    a second circuit for circulating a second solution through said upper section and said packed bed unit in said first direction, wherein said second solution is a caustic solution, wherein said second circuit further includes a slurry tank and a solids/wetcake separator;
    a flue gas inlet in communication with said lower section and a treated flue gas outlet in communication with said upper section whereby a flue gas stream passes in a second direction through said lower section past said liquid collection tray and then through said upper section including said packed bed unit.

2. The apparatus of claim 1, wherein said caustic solution comprises a soluble calcium compound in combination with an alkali caustic reagent at an operating pH of between 6 and 7.5.

3. The apparatus of claim 2, wherein said alkali caustic reagent is selected from a group consisting of sodium hydroxide, potassium hydroxide, sodium carbonate/bicarbonate, potassium carbonate/bicarbonate and mixtures thereof.

4. The apparatus of claim 3, wherein said first solution has an operating pH between 2.5 and 7.

5. The apparatus of claim 1, wherein said liquid collection tray collects said caustic solution while allowing passage of flue gas.

6. The apparatus of claim 5, further including a sump at a bottom of said lower section.

7. The apparatus of claim 6, wherein said first circuit includes at least one first spray head, a first inlet in communication with said sump and at least one first pump for circulating said first solution from said sump to said at least one first spray head.

8. The apparatus of claim 7, wherein said second circuit includes at least one second spray head, a second inlet in communication with said liquid collection tray and at least one second pump for circulating said caustic solution from said liquid collection tray to said at least one second spray head overlying said packed bed unit.

9. The apparatus of claim 8, wherein lime or limestone is added to a sulfur rich caustic solution in said slurry tank to convert said soluble sulfur to gypsum and said gypsum and other solids are then removed from said caustic solution by said solution/wetcake separator before circulating said caustic solution back to said at least one second spray head.

10. The apparatus of claim 9, further including a caustic solution source connected to said second circuit between said solids/wetcake separator and said at least one second spray head.

11. The apparatus of claim 10, further including a gypsum discharge circuit including a third inlet in communication with said sump, at least one third pump, at least one solids separator and an outlet in communication with said at least one first spray head whereby gypsum is separated from said first solution and said first solution is returned to said lower section of said absorber tower.

12. The apparatus of claim 11, wherein said absorber tower further includes an oxidation air inlet in communication with said lower section and with said slurry tank.

13. The apparatus of claim 12, further including a first solution makeup circuit including a water source, a source of lime or limestone, a mill for milling said lime or limestone, a second slurry tank for receiving water and lime or limestone from said sources and creating said first solution, a fourth pump for pumping and an outlet for delivering said first solution to said lower section of said absorber tower.

14. A method of removing sulfur oxides from a flue gas stream, comprising;
    delivering a flue gas stream to an absorber tower including a lower section and an upper section;
    treating said flue gas stream with a countercurrent stream of a first solution of limewater or limestone slurry in said lower section;
    subsequently passing said flue gas through a packed bed unit while contacting said flue gas with a caustic solution in said upper section; and
    discharging treated flue gas from said absorber tower.

15. The method of claim 14, including collecting said caustic solution in a liquid collecting tray at a bottom of said upper section.

16. The method of claim 15, further including removing sulfur from said caustic solution collected by said liquid collection tray.

17. The method of claim 16, including recirculating said caustic solution through said upper section through a second spray head above said packed bed unit.

18. The method of claim 17, wherein said sulfur is removed from said caustic solution by reacting said soluble sulfur with calcium hydroxide to produce gypsum and then separating said gypsum from said caustic solution.

19. The method of claim 18, including recirculating said first solution through said lower section to a first spray head below said liquid collection tray.

* * * * *